United States Patent [19]

Jiu et al.

[11] 3,909,362

[45] Sept. 30, 1975

[54] MICROBIAL PRODUCTION OF ANTI-MICROBIAL 2H-PYRAN-2-ONES

[75] Inventors: James Jiu, Morton Grove; Stephen Kraychy, Northbrook; Seth S. Mizuba, Morton Grove, all of Ill.

[73] Assignee: G. D. Searle & Co., Chicago, Ill.

[22] Filed: May 28, 1974

[21] Appl. No.: 473,515

[52] U.S. Cl..................................... 195/81; 195/100
[51] Int. Cl.²......................................... C12D 9/04
[58] Field of Search.................... 195/81, 100, 80 R

[56] References Cited
OTHER PUBLICATIONS

Evans et al., Tetrahedron Letters, No. 22, pp. 1791–94, Pergamon Press, Great Britain, (1969).
Rosenbrook et al., Tetrahedron Letters, No. 22, pp. 1867–70, Pergamon Press, Great Britain, (1970).
Argoudelis et al., Tetrahedron Letters, No. 18, pp. 1969–73, Pergamon Press Ltd., Great Britain, (1966).

*Primary Examiner*—A. Louis Monacell
*Assistant Examiner*—Thomas G. Wiseman
*Attorney, Agent, or Firm*—John J. McDonnell

[57] ABSTRACT

This invention is concerned with a method of producing compounds of the formulae (*a*), (*b*) and (*c*).

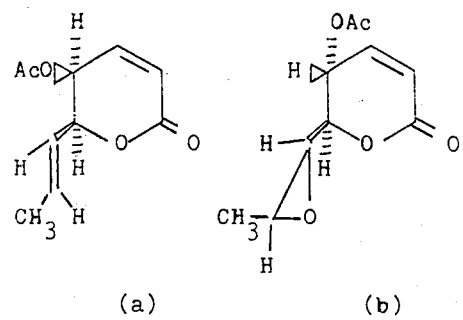

(a)        (b)

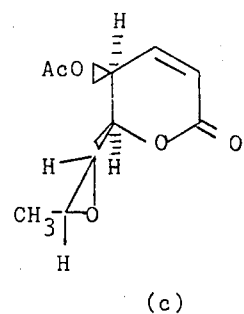

(c)

These compounds are prepared by extracting a growth and growth medium of *Aspergillis sp.* NRRL 5769 or NRRL 5770 with an organic solvent and isolating the respective structures. Compounds (*a*), (*b*) and (*c*) have anti-*Candida albicans* activity.

5 Claims, No Drawings

MICROBIAL PRODUCTION OF ANTI-MICROBIAL 2H-PYRAN-2-ONES

This invention is concerned with a method of producing compounds of the formulae (a), (b) and (c).

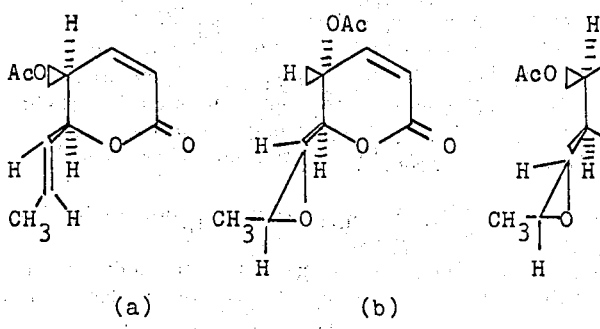

(a)   (b)   (c)

Compound (c) was described by Rosenbrook and Carney, Tetrahedron Letters 1867 (1970) and Argoudelis isolated (c) from Aspergillus nidulens, Tetrahedron Letters 1969 (1966).

The present invention involves a process for simultaneously producing anti-microbial compounds 5,6-dihydro-5(S)-acetoxy-6(S)-(1',2'-trans-epoxy-propyl) 2H-pyran-2-one, 5,6-dihydro-5(R)-acetoxy 6(S)-(1',2'-trans-epoxypropyl)2H-pyran-2-one, and 5,6-dihydro-5(S)-acetoxy-6(S)(1',2'-trans-propenyl)2H-pyran-2-one comprising growing Aspergillus sp. *NRRL 5769 or Aspergillus sp. *NRRL 5770 in an aqueous nutrient medium and isolating said anti-microbial compounds.

*NRRL cultures can be obtained at A.R.S. Culture Collection, 1815 North University St., Peoria, Ill. 61604.

The compounds are isolated from a growth and growth medium of Aspergillus sp. NRRL 5769 or NRRL 5770. The isolation procedure involves extraction with common organic solvents such as methylene chloride, chloroform, carbon tetrachloride, benzene, toluene, hydrocarbons containing 5–8 carbon atoms. The crude extracts are further refined by column chromatography, by eluting the column progressively with less polar to more polar elements. Fractional crystallization of impure column fractions also aids in purification. Those skilled in the art will recognize interchangeability of a variety of extraction, chromatography, and fractional crystallization conditions.

A nutrient medium is required for culture of the organism, which is to say one containing assimiable nitrogen and carbon; and an adequate supply of sterile air should be maintained therein, for example, by exposing a large surface of the medium to the air or preferably passing it through the medium in quantities sufficient to support submerged growth.

Suitable nitrogen sources are thus normally employed for the purpose, including soy bean meal, corn-steep liquor, meat extract, protein (optionally digested), peptone, yeast extract, distillers' solubles, casein hydrolysate, nitrate, cottonseed meal and/or ammonium compounds. All of the foregoing materials excepting sometimes the last two serve also as carbon sources. Other carbon-containing substances satisfactory and conventionally used as nutrients are the carbohydrates, for example, glycerol, glucose, fructose, sucrose, lactose, maltose, inositol, dextrin, starch and whey, among which inositol is additionally useful.

Phosphate, magnesium, and/or ferrous ions likewise may be incorporated in the culture medium as growth-promoting factors if desired; buffers may be added to assure that growth is initiated at a suitable pH. In the present invention sitosterol or sitostenone is used as inducing agents to increase yields of the desired products.

In a preferred embodiment a medium containing 10 parts cottonseed meal, 50 parts glucose, 30 parts corn steep liquor, 0.3 part concentrated hydrochloric acid, and 1000 parts tap water having a pH of $3.9 \pm 0.2$ is sterilized for 15 minutes at 121°. To this medium is added 0.010 to 0.025 part of sitosterol or sitostenone and then the medium is innoculated with Aspergillus sp. NRRL 5770 and incubated for 6 days. The growth and growth medium is extracted with 2000 parts of methylene chloride. The methylene chloride is removed by evaporation to provide a crude extract.

The crude extract is surprisingly active in inhibiting the growth of Candida albicans; it is more active in this regard than either compound (a), (b) or (c).

Thus the present invention provides an anti-Candida albicans product produced by the pocess of growing Aspergillus sp. NRRL 5769 in an aqueous nutrient medium, extracting said aqueous nutrient medium containing Aspergillus sp. NRRL 5770 or Aspergillus sp. NRRL 5769 with organic solvent to provide an organic solvent extract, separating said organic solvent extract from the aqueous nutrient medium, and evaporating the organic solvent from organic solvent extract.

This activity is determined on 8.5 cm. plates containing 10 ml. of Sabourand dextrose agar and coated with $10^7$ cells per ml. solution of a 24 hour growth of Candida albicans. 75 Units of Nystatin standard is absorbed on a 6.35 mm. disc of filter paper and dried. Test compound is likewise absorbed on a 6.35 mm. disc of filter paper and dried. Test and standard discs are placed on the agar plate and this test system is incubated for 24 hours. Test compounds having zones of inhibition of 13–15 mm. diameter comparable to that of the Nystatin standard are considered active. This is an effective method of monitoring the chromatography of active constituents.

The crude extracts from methylene chloride extraction are taken up to the extent soluble in benzene and the benzene solution is placed on a silica gel column. A combination of elution with progressively more polar solvents and fractional crystallization provides 5,6-dihydro-5(S)-acetoxy-6(S)-(1',2'-trans-epoxypropyl)2H-pyran-2-ones (formula (c)), 5,6-dihydro- 5(R)-acetoxy-6(R)-(1',2'-trans-epoxypropyl)2H-pyran-2-one (formula (b)), and 5,6-dihydro-5(S)-acetoxy-6(S)-(1',2'-trans-propenyl)2H-pyran-2-one (formula (a)). 5,6-Dihydro-5(S)-acetoxy-6(R)-(1',2'-trans-epoxypropyl)2H-pyran-2-one is a particularly active anti-fungal agent.

The anti-fungal utility of this compound is evident from the results of standardized test whereby two concentrations of Sabouraud dextrose agar (manufactured by Baltimore Biological Laboratories or Difco) are prepared, one as recommended by the manufacturer and the other at twice this concentration. These preparations are sterilized and then maintained in a fluid state at 80°C. Meanwhile, a compound is heated in sterile distilled water at a concentration of 2000 γ/ml. and a temperature of 80°C. for 20 minutes. An equivolume mixture of this compound preparation and the double-strength agar is serially diluted and mixed with the single-strength agar in amounts such that concentrations of 1000, 100, 10, and 1 γ of test compound per ml. result. The mixtures thus obtained are allowed to cool and solidify, whereupon they are surface-inoculated with a suspension of C. albicans, and then incubated aerobically at room temperatures. The incubation period is 48 hours for C. albicans. Activity is determined by gross examination, and the potency is expressed as the minimum concentration at which no growth of the test organism is discernible. Controls are provided by concurrent incubations identical with the foregoing except for the absence of compound. Compounds (a), (b) and (c) were found active.

EXAMPLE 1

Methylene chloride extraction of a 1000 gallon fermentation of Aspergillus sp. NRRL 5769 in a medium containing 10 parts cottonseed meal, 50 parts glucose, 30 parts cornsteep liquor, 0.3 part hydrochloric acid, 1000 parts tap water and .01–.025 part sitosterol; sterilized at 121°C. for 15 minutes; and having a pH of 3.9 ± .2 provided 1654 g. of crude extract after removal of the methylene chloride in vacuo.

75 Parts of the crude extract is dissolved in a minimal volume of benzene. The solution is loaded onto a column containing 1500 parts Mallindkrodt CC-7 silicic acid. The column is eluted successively with solvent systems of increasing polarity; using various combinations of benzene, ethyl acetate and methanol.

The fractionation (purification) procedure is monitored by means of an in vitro agar diffusion assay against Candida albicans.

This activity is determined on 8.5 cm. plates containing 10 ml. of Sabouraud dextrose agar and coated with $10^7$ cells per 0.1 ml. solution of a 24 hour growth of Candida albicans. Nystatin standard containing 75 units is absorbed on 6.35 mm. disc of filter paper and dried. Test compound is likewise absorbed on a 6.35 mm. disc of filter paper and dried. Test and standard discs are placed on the agar plate and incubated for 24 hours. Zones of inhibition of 13–15 mm. in diameter comparable to Nystatin standard are considered active. This is an effective method of following chromatography of active constituents.

A. The active fractions eluted with 5%, 10% and 15% ethyl acetate-benzene are pooled and further purified by chromatographing on 865 g. of silicic acid.

B. The active fractions eluted with 20%, 30% and 50% ethyl acetate-benzene are pooled to provide 30 g. of crude material and further purified by chromatographing on 1020 g. of silicic acid.

C. The active fractions eluted with 100% ethyl acetate, 5% and 10% methanol-ethyl acetate are pooled to provide 7 g. of crude material and further purified by chromatographing on 250 g. of silicic acid.

These three secondary columns are eluted in a manner similar to that described above. These three secondary columns are worked-up simultaneously with the aid of both in vitro anti-Candida albicans test and thin layer chromatography. The fractions are worked-up as follows.

Those active fractions containing principally 5,6-dihydro-5(S)-acetoxy-6(S)-(1',2'-trans-epoxypropyl)2H-pyran-2-one were individually crystallized to yield first, second and occassionally third crops of 5,6-dihydro-5(S)-acetoxy-6(S)-(1',2'-trans-epoxypropyl)2H-pyran-2-one. Final purification is achieved by combining all the crystalline crops and further recrystallizing from hexane-ethyl acetate to give 22 g. of 5,6-dihydro-5(S)-acetoxy-6(S)-(1',2'-trans-epoxypropyl)2H-pyran-2-one, mp 69.5°–71°C. A second crop of 9.627 g. of crystals is obtained. Elemental analysis $C_{10}H_{12}O_5$ MW 212 calcd. C 56.60, H 5.70, O 37.70; Found C 56.61, H 5.58, O 37.43; $[\alpha]_D^{28} + 331.0$ (C=1.006, MEOH) U.V. maximum at approximately 205 nm. E=12,000; IR 1745, 1720, 1640 $cm^{-1}$. This compound has the following structural formula.

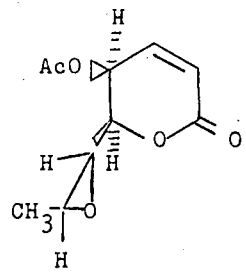

(c)

The mother liquors from the above crystals are combined, 8.5 g. and chromatographed on 1,700 g. CC-7. The column is eluted in a manner similar to that described above. Further chromatography of the appropriate combined fractions (3.5 g.) and crystallization from hexane-ethyl acetate provides 170 mg. of 5,6-dihydro-5(S)-acetoxy-6(S)-(1',2'-trans-propenyl)2H-pyran-2-one as long needles, mp 52°–54°. Elemental analysis $C_{10}H_{12}O_4$. MW 196.2 calcd. C 61.21, H 6.17, O 32.62; found C 61.45, H 6.35, O 32.61; $[\alpha]_D^{29} + 311.8$. This compound has the following structural formula.

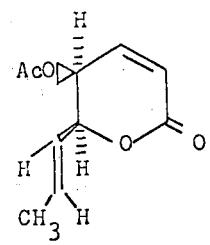

(a)

Those active fractions from the secondary columns which contained some 5,6-dihydro-5(R)-acetoxy-6(S)-(1',2'-trans-epoxypropyl)2H-pyran-2-one are combined, 4.7 g. and chromatographed on 950 g. CC-7. The column is eluted in a manner similar to that described above.

Those active fractions containing principally 5,6-dihydro-5(R)-acetoxy-6(S)-(1',2'-trans-epoxypropyl)2H-pyran-2-one are individually crystallized from hexane-ethyl acetate to yield first and some second crops. The crystalline materials are combined and further recrystallized to provide 659 mg. of 5,6-dihydro-5(R)-acetoxy-6(S)-(1',2'-trans-epoxypropyl)2H-pyran-2-one, mp 62.5°–64°. Elemental analysis $C_{10}H_{12}O_5$. MW 212 calcd. C 56.60, H 5.70, O 37.70; found C 57.04, H 5.80, O 37.36; $[\alpha]_D^{28}$ + 224.2 (C = 0.997 MEOH). This compound has the following structural formula.

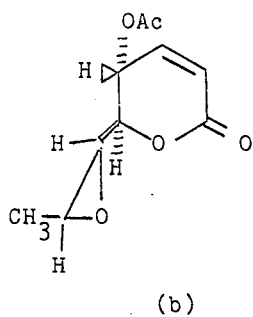

(b)

What is claimed is:

1. A process for simultaneously producing anti-microbial compounds 5,6-dihydro-5(S)-acetoxy-6(S)-(1',2'-trans-epoxypropyl)2H-pyran-2-one, 5,6-dihydro-5(R)-acetoxy-6(S)-(1',2'-trans-epoxypropyl)2H-pyran-2-one, and 5,6-dihydro-5(S)-acetoxy-6(S)-(1',2'-trans-propenyl)2H-pyran 2-one comprising growing *Aspergillus sp.* NRRL 5769 or *Aspergillus sp.* NRRL 5770 in an aqueous nutrient medium containing sitosterol or sitostenone and isolating said anti-microbial compounds.

2. As in claim 1, a process for simultaneously producing anti-microbial compounds 5,6-dihydro-5(C)-acetoxy-6(S)-(1',2'-trans-epoxypropyl)2H-pyran-2-one, 5,6-dihydro-5(R)-acetoxy-6(S)-(1',2'-trans-epoxypropyl)2H-pyran-2-one, and 5,6-dihydro-5(S)-acetoxy-6(S)-(1',2'-trans-propenyl)2H-pyran-2-one comprising growing *Aspergillus sp.* NRRL 5769 in an aqueous nutrient medium and isolating said anti-microbial compounds.

3. As in claim 1, a process for simultaneously producing anti-microbial compounds 5,6-dihydro-5(S)-acetoxy-6(S)-(1',2'-trans-epoxypropyl)2H-pyran-2-one, 5,6-dihydro-5(R)-acetoxy-6(S)-(1',2'-trans-epoxypropyl)2H-pyran-2-one, and 5,6-dihydro-5(S)-acetoxy-6(S)-(1',2'-trans-propenyl)2H-pyran-2-one comprising growing *Aspergillus sp.* NRRL 5770 in an aqueous nutrient medium and isolating said anti-microbial compounds.

4. As in claim 1, a process wherein the growth medium contains an effective amount of sitostenone to stimulate production of said anti-microbial compounds.

5. As in claim 1, an anti-*Candida albicans* product produced by the process of growing *Aspergillus sp.* NRRL 5769 in an aqueous nutrient medium, extracting said aqueous nutrient medium containing *Aspergillus sp.* NRRL 5769 or *Aspergillus sp.* NRRL 5770 with organic solvent to provide an organic solvent extract, separating said organic solvent extract from the aqueous nutrient medium, and evaporating the organic solvent from organic solvent extract.

* * * * *